(12) United States Patent
Didierjean et al.

(10) Patent No.: US 10,350,994 B2
(45) Date of Patent: Jul. 16, 2019

(54) METHOD FOR HYDRAULICALLY ASSISTING THE DRIVE OF A VEHICLE AT LOW-SPEED

(71) Applicant: POCLAIN HYDRAULICS INDUSTRIE, Verberie (FR)

(72) Inventors: Claude Didierjean, Verberie (FR); Gery Depierre, Verberie (FR); Pierre-Louis Houillon, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 94 days.

(21) Appl. No.: 15/516,095

(22) PCT Filed: Oct. 2, 2015

(86) PCT No.: PCT/FR2015/052647
§ 371 (c)(1),
(2) Date: Mar. 31, 2017

(87) PCT Pub. No.: WO2016/051108
PCT Pub. Date: Apr. 7, 2016

(65) Prior Publication Data
US 2018/0229603 A1 Aug. 16, 2018

(30) Foreign Application Priority Data
Oct. 3, 2014 (FR) ..................................... 14 59501

(51) Int. Cl.
*B60K 17/10* (2006.01)
*B60K 17/356* (2006.01)
(Continued)

(52) U.S. Cl.
CPC ............ *B60K 17/10* (2013.01); *B60K 17/356* (2013.01); *F16H 61/431* (2013.01); *F16H 61/472* (2013.01)

(58) Field of Classification Search
CPC .............................. B60K 7/0015; B60K 17/14
(Continued)

(56) References Cited

U.S. PATENT DOCUMENTS

| 3,374,847 A | 3/1968 | Budzich |
| 4,570,741 A * | 2/1986 | McCoy ................ B60K 7/0007 |
| | | 180/242 |

(Continued)

FOREIGN PATENT DOCUMENTS

| EP | 0 993 982 B1 | 4/2000 |
| FR | 2 504 987 A1 | 11/1982 |
| FR | 3004148 A1 | 10/2014 |

OTHER PUBLICATIONS

English language translation of International Search Report issued in corresponding International Application No. PCT/FR2015/052647, dated Dec. 1, 2015 (2 pages).

*Primary Examiner* — Jeffrey J Restifo
(74) *Attorney, Agent, or Firm* — The Webb Law Firm

(57) ABSTRACT

According to the method, transmission apparatus of a vehicle, the apparatus comprising a drive engine (18), a mechanical transmission (16) connected to the drive engine, and a hydraulic transmission (20) having a pump (24) and n hydraulic motors (26A, 26B), where n is greater than or equal to 1, the pump being suitable for being driven by the drive engine for feeding fluid to the hydraulic motors. The method consists in performing a "low-speed" assistance stage, during which, when the vehicle is driven by the mechanical transmission, the method consists in establishing a setpoint pressure for the pressure difference between the feed and the discharge of each of the hydraulic motors, in feeding the hydraulic motors by the pump, in detecting the pressure difference between the feed and the discharge (28A, 28B) of each of the hydraulic motors (26A, 26B), and in (Continued)

adjusting the delivery rate of the pump so that said pressure difference is substantially equal to said setpoint pressure.

15 Claims, 2 Drawing Sheets

(51) Int. Cl.
  *F16H 61/431* (2010.01)
  *F16H 61/472* (2010.01)
(58) Field of Classification Search
  USPC .................................. 180/305, 306, 307
  See application file for complete search history.

(56) References Cited

U.S. PATENT DOCUMENTS

| | | | | |
|---|---|---|---|---|
| 6,067,795 | A * | 5/2000 | Iino | F16H 47/04 |
| | | | | 180/338 |
| 6,086,513 | A * | 7/2000 | Tominaga | F16H 61/0021 |
| | | | | 477/169 |
| 6,209,675 | B1 * | 4/2001 | Hayashi | F16H 61/4017 |
| | | | | 180/165 |
| 6,938,719 | B2 * | 9/2005 | Ishimaru | B60W 10/06 |
| | | | | 180/305 |
| 6,941,688 | B2 * | 9/2005 | Ichimura | E02F 9/2296 |
| | | | | 172/3 |
| 6,966,180 | B2 * | 11/2005 | Deneir | F04B 49/08 |
| | | | | 60/327 |
| 7,112,154 | B2 * | 9/2006 | Wakahara | F16H 61/0021 |
| | | | | 474/18 |
| 7,331,900 | B2 * | 2/2008 | Oshita | F16H 61/12 |
| | | | | 477/45 |
| 7,506,717 | B2 * | 3/2009 | Tatsuno | B60W 30/18045 |
| | | | | 180/242 |
| 8,118,132 | B2 * | 2/2012 | Gray, Jr. | B60K 6/12 |
| | | | | 180/305 |
| 8,286,748 | B2 * | 10/2012 | Takahashi | F16H 61/431 |
| | | | | 180/305 |
| 8,303,046 | B2 * | 11/2012 | Nakata | B60K 6/445 |
| | | | | 188/1.11 E |
| 8,322,481 | B2 * | 12/2012 | Satake | B60W 10/06 |
| | | | | 180/305 |
| 8,333,069 | B2 * | 12/2012 | Heren | B60K 17/10 |
| | | | | 180/242 |
| 8,342,284 | B2 * | 1/2013 | Takahashi | F16H 61/431 |
| | | | | 180/305 |
| 8,403,098 | B2 * | 3/2013 | Lunzman | E02F 9/2235 |
| | | | | 180/307 |
| 8,418,798 | B2 * | 4/2013 | Mori | B60W 30/18063 |
| | | | | 180/307 |
| 8,494,733 | B2 * | 7/2013 | Kodaka | B60W 10/06 |
| | | | | 180/305 |
| 8,532,886 | B1 * | 9/2013 | Shirao | E02F 9/2253 |
| | | | | 180/307 |
| 8,540,048 | B2 * | 9/2013 | Will | F16H 61/4017 |
| | | | | 180/338 |
| 8,649,945 | B2 * | 2/2014 | Shirao | E02F 3/36 |
| | | | | 180/305 |
| 8,714,325 | B2 * | 5/2014 | Jinno | F16H 61/143 |
| | | | | 192/3.29 |
| 8,801,393 | B2 * | 8/2014 | Crabtree | B60K 25/02 |
| | | | | 180/305 |
| 8,839,897 | B2 * | 9/2014 | Moore | B60W 20/14 |
| | | | | 180/165 |
| 8,857,172 | B2 * | 10/2014 | Prigent | B60K 17/356 |
| | | | | 60/413 |
| 8,978,375 | B2 * | 3/2015 | Prigent | F04C 11/003 |
| | | | | 180/165 |
| 9,074,347 | B2 * | 7/2015 | Vigholm | E02F 9/2217 |
| 9,139,983 | B2 * | 9/2015 | Yoshida | E02F 3/325 |
| 9,506,222 | B2 * | 11/2016 | Britten | F16H 61/421 |
| 9,625,033 | B2 * | 4/2017 | Naito | F16H 61/02 |
| 9,671,013 | B2 * | 6/2017 | Fujikawa | F16H 61/00 |
| 9,745,972 | B2 * | 8/2017 | Krittian | B66F 9/22 |
| 9,896,935 | B2 * | 2/2018 | Prigent | B60K 17/356 |
| 9,915,056 | B2 * | 3/2018 | Tanaka | F15B 11/17 |
| 9,989,148 | B2 * | 6/2018 | Ogata | F16H 61/0021 |
| 10,017,918 | B2 * | 7/2018 | Tsukada | E02F 9/22 |
| 10,023,171 | B2 * | 7/2018 | Okuda | F16H 61/686 |
| 2007/0101709 | A1 | 5/2007 | Cronin | |

* cited by examiner

METHOD FOR HYDRAULICALLY ASSISTING THE DRIVE OF A VEHICLE AT LOW-SPEED

CROSS-REFERENCE TO RELATED APPLICATIONS

This application is the U.S. national phase entry under 35 U.S.C. § 371 of International Application No. PCT/FR2015/052647, filed on Oct. 2, 2015, which claims priority to French Patent Application No. 1459501, filed on Oct. 3, 2014, the entireties of which are herein incorporated by reference.

BACKGROUND

The present invention relates to a method of controlling transmission apparatus of a vehicle, the apparatus comprising a drive engine, a mechanical transmission connected to the drive engine, and a hydraulic transmission having a pump and n hydraulic motors, where n is greater than or equal to 1, the pump being suitable for being driven by the drive engine for feeding fluid to the hydraulic motors.

It is known, for example from European Patent EP 0 993 982, that combined use can be made of a hydraulic transmission and of a mechanical transmission. The hydraulic transmission is used whenever necessary, in particular for assisting the mechanical transmission under travel conditions that require such assistance, e.g. in the event of loss of grip of at least one of the wheels of the vehicle while it is travelling over slippery terrain, such as the terrain on a building site. Thus, under "normal" conditions of use of the hydraulic assistance, the delivery rate of the pump is determined so as to drive the wheels connected to the hydraulic motors at the same speeds as the wheels connected to the mechanical transmission. Control of the pump thus depends on the information obtained about the speed of the vehicle.

In certain situations, the assistance must be provided at low speed, e.g. in a situation in which the vehicle is starting to move after being at a standstill. Unfortunately, in such situations, the information obtained about the speed of the vehicle can be unreliable because the speed is then too slow to be determined accurately. Therefore, controlling the hydraulic assistance on the basis of the speed of the vehicle cannot be fully effective. The necessary computed data can momentarily be deviant, variable, or erratic. That results in risks of differences between the speeds of the wheels driven by the hydraulic transmission and the speeds of the wheels driven by the mechanical transmission, which differences are detrimental to good drivability of the vehicle. In particular, jolts can take place, with thrust that is too low, or thrust that is too high on the wheels driven by the hydraulic transmission.

An object of the present invention is to solve that difficulty by proposing a method of controlling the hydraulic transmission that provides effective hydraulic assistance, even at low speed.

This object is achieved by the fact that the method comprises performing a "low-speed" assistance stage, during which, while the vehicle is driven by the mechanical transmission, a setpoint pressure for the pressure difference between the feed and the discharge of each of the hydraulic motors is established, the hydraulic motors are fed by the pump, the pressure difference between the feed and the discharge of each of the hydraulic motors is detected, and the delivery rate of the pump is adjusted so that said pressure difference is substantially equal to said setpoint pressure.

Thus, it is on the basis of the setpoint pressure that the delivery rate of the pump is adjusted, without necessarily taking into account the real speed of the vehicle. The wheels coupled to the hydraulic transmission are driven reliably, at a controlled speed that depends on said setpoint pressure. The hydraulic assistance stage is effective and efficient, because the delivery rate of the pump is adjusted to obtain the desired pressure difference, thereby enabling the hydraulic transmission to deliver significant torque, making it possible to control the speeds of the wheels coupled to the hydraulic transmission, and, when necessary, to achieve a controlled increase in speed. The setpoint pressure is determined, as a function of the total torque required, so that it delivers a setpoint hydraulic torque, corresponding to the needs for supplementing the drive torque.

As explained below, it is possible to cause the low-speed assistance stage to cease under various conditions, e.g. when a parameter representative of the speed of the vehicle reaches a determined threshold, and to continue the hydraulic assistance in conventional manner, by taking the speed of the vehicle into account, or else to cause the hydraulic assistance to cease.

Optionally, a starting situation in which the vehicle starts being driven by the mechanical transmission is detected, and the low-speed assistance stage is performed as assistance with the starting.

It is particularly advantageous to use hydraulic assistance as assistance with starting after the vehicle has been at a standstill. In particular when the vehicle is a heavy goods vehicle or a site vehicle, starting it moving requires very high drive torque, which is very demanding on the mechanical transmission and consumes a large amount of energy. In addition, the increase in speed can be slow. The torque available for starting the vehicle is the combination of the drive torque developed by the mechanical transmission and of the hydraulic torque developed by the hydraulic transmission. The hydraulic assistance enables the speed of the vehicle to increase more rapidly and enables starting to be less demanding on the mechanical transmission, resulting in lower energy consumption. The setpoint pressure makes it possible to control the hydraulic transmission reliably, despite the fact that, during starting, the speed of the vehicle is very low.

Optionally, when the starting situation is detected, the assistance with starting remains inactivated so long as the amplitude of actuation of the acceleration control of the vehicle has not reached a target amplitude.

This makes it possible to avoid a situation in which the acceleration control being actuated prior to starting is misinterpreted as a need for assistance with starting. In other words, this avoids a situation in which, while the driver is preparing to start, but before actually starting, the hydraulic transmission delivers unwanted interfering traction. For example, the target amplitude is about 5% of the total stroke of the acceleration control. Optionally, the low-speed assistance stage, and in particular the assistance with starting, is caused to cease when at least one of the following events occurs:

a parameter representative of the speed of the vehicle reaches a predetermined value (this parameter being, for example, the speed of the vehicle or indeed the speeds of the wheels driven by the hydraulic motors, or the speeds of said motors);
  the duration of the low-speed assistance stage reaches a predetermined duration;
  the outlet torque needed from the mechanical transmission decreases to a predetermined value; and a clutch connecting the mechanical transmission to the drive engine is released for a predetermined duration, which may be equal to 0, after it has been actuated.

The low-speed assistance stage is temporary. To cause it to cease, it is possible, for example, to isolate the pump from the feed and discharge ducts of the hydraulic motors, or indeed to place the pump in its zero cylinder capacity configuration, or indeed, as explained below, to make provision for the hydraulic motors to deliver zero torque. The above-mentioned parameters are simple to implement, and are indeed indicative of the vehicle starting to travel under normal conditions, i.e. that the torque required can be delivered by the mechanical transmission on its own. For example, the vehicle speed as from which the low-speed assistance stage is caused to cease may be about 5 kilometers per hour (km/h), or indeed 2 km/h. The predetermined duration may be about 1 minute, or 30 seconds (s), or indeed 10 s. When the parameter used is the needed outlet torque, the predetermined value may be an absolute value, e.g. 4000 newton meters (N·m), or, rather, a percentage of the nominal maximum torque of the mechanical transmission, e.g. 20%.

Optionally, the value of the setpoint pressure is caused to vary during the low-speed assistance stage.

In particular, this variation involves a decrease over time, it being possible for this decrease to be progressive (e.g. linear), optionally after an initial dwell stage during which the setpoint pressure is maintained constant, just at the beginning of the low-speed assistance stage. This variation in the setpoint pressure makes it possible firstly to avoid the speeds at which the wheels are driven being inappropriate for the real instantaneous speed of the vehicle and, in particular, to avoid negative-torque jolts. Secondly, it makes it possible to cause the hydraulic assistance to cease progressively, smoothly and without any sudden drop in the total torque.

Optionally, during the low-speed assistance stage, the value of the setpoint pressure is caused to decrease from a maximum value CPmax to a minimum value CPmin, said minimum value CPmin being reached at the end of the low-speed assistance stage.

Optionally, a setpoint pressure ceiling Pmax is defined and the maximum value for the setpoint pressure CPmax is determined, using the relationship CPmax=f×Pmax, the coefficient f being less than or equal to 1, and being a function of requested characteristics for the low-speed assistance, such as the amplitude of actuation of the acceleration control of the vehicle.

Thus, the variation in the setpoint pressure may be directly related to the acceleration request made by the driver of the vehicle. As the speed of the vehicle approaches the speed desired by the driver for the first gear, the driver tends to release the acceleration control, thereby actually expressing a reduction in the need for torque. The assistance hydraulic torque thus decreases naturally, following the decrease in the need for torque revealed by the reduction in the amplitude of actuation of the acceleration control. It might be said that the aggressiveness of the traction effected by the hydraulic transmission thus depends on the amplitude of the acceleration control, whereas the aggressiveness of the traction effected by the mechanical transmission can depend on the extent to which the clutch control is released.

Optionally, the coefficient f is equal to 1 when the amplitude of actuation of the acceleration control is at least equal to a predetermined percentage of the total stroke of said control, said predetermined percentage being, in particular, in the range 20% to 40%, and more particularly 30%.

As a result, the maximum assistance hydraulic torque is delivered so long as the significant amplitude of actuation of the acceleration control expresses a high need for torque, in particular for accelerating or for starting.

Optionally, the value of the setpoint pressure is maintained at the maximum value CPmax from the beginning of the low-speed assistance stage to the moment at which the drive of the vehicle reaches a determined intermediate state, and then the value of the setpoint pressure is caused to decrease to the minimum value CPmin reached at the end of the low-speed assistance stage.

This intermediate state being reached reveals that the vehicle has started to move in a sufficiently clear and lasting manner for the need for assistance hydraulic torque to start decreasing.

Optionally, the value of the setpoint pressure is caused to decrease using a determined variation relationship, in particular a linear variation relationship.

Optionally, the intermediate state is reached when a parameter representative of the speed of the vehicle reaches a determined intermediate value.

For example, the intermediate target speed is about 2 km/h.

Optionally, activation of the low-speed assistance is enabled or is disabled.

Optionally, during the low-speed assistance stage, the delivery rate of the pump is adjusted by causing the cylinder capacity of said pump to vary.

This is a simple and reliable way of causing the delivery rate of the pump to vary. Another possibility is to cause the speed of the drive engine to vary, but this is difficult at low speed, in particular while the vehicle is starting to move, while said engine is being subjected to high demands for causing the vehicle to start moving. Another possibility, when the pump is connected to the drive engine via an interface making it possible to vary the engine to pump drive ratio, is to cause said ratio to vary.

Optionally, switching-over is performed between a low-speed assistance stage and a hydraulic assistance stage in which the delivery rate of the pump is determined as a function of the outlet speed of the mechanical transmission.

In particular, the n hydraulic motors of the hydraulic transmission are motors having radial pistons. Thus, the or each hydraulic motor may comprise:
 a casing with a multi-lobe undulating cam;
 a cylinder block, mounted to rotate relative to the cam about an axis of the motor, and having radial cylinders in which the radial pistons slide; and
 an internal fluid distributor, prevented from rotating relative to the cam and having distribution ducts suitable for being connected to a fluid feed and to a fluid discharge so that, when the motor is active, it connects the cylinders to the feed and to the discharge in alternation.

In particular, the distributor has a radial distribution face, in which the distribution ducts open out and which is held in abutment against a radial communication face of the cylinder block, in which face the cylinder ducts open out.

The or each hydraulic motor can be deactivated by declutching its pistons, i.e. by causing the pistons to retract into their cylinders so that they cease to be in contact with the cam. This declutching can be achieved by causing a declutching pressure to prevail in the inside space of the casing, and, optionally by means of return springs associated with the pistons. When the pistons are declutched, the distribution ducts can be put at the same pressure, in particular at a low boost pressure.

In particular, one hydraulic motor is provided for each of the wheels that can be driven by the hydraulic transmission, the rotor of a motor provided for driving a wheel being coupled directly to the wheel so as to drive it at its outlet speed.

In particular, one hydraulic motor is provided for each of the wheels that can be driven by the hydraulic transmission, and said motors are of the rotary cam type, it then being possible for their casings to constitute portions of the hubs of the wheels to which they are coupled.

Thus, in particular as a function of the speed of the vehicle, it is possible to switch from one assistance mode to the other.

BRIEF DESCRIPTION OF THE DRAWINGS

The invention can be well understood and its advantages appear more clearly on reading the following detailed description of an embodiment that is shown by way of non-limiting example. The description refers to the accompanying drawings, in which.

DETAILED DESCRIPTION

Figure 1:
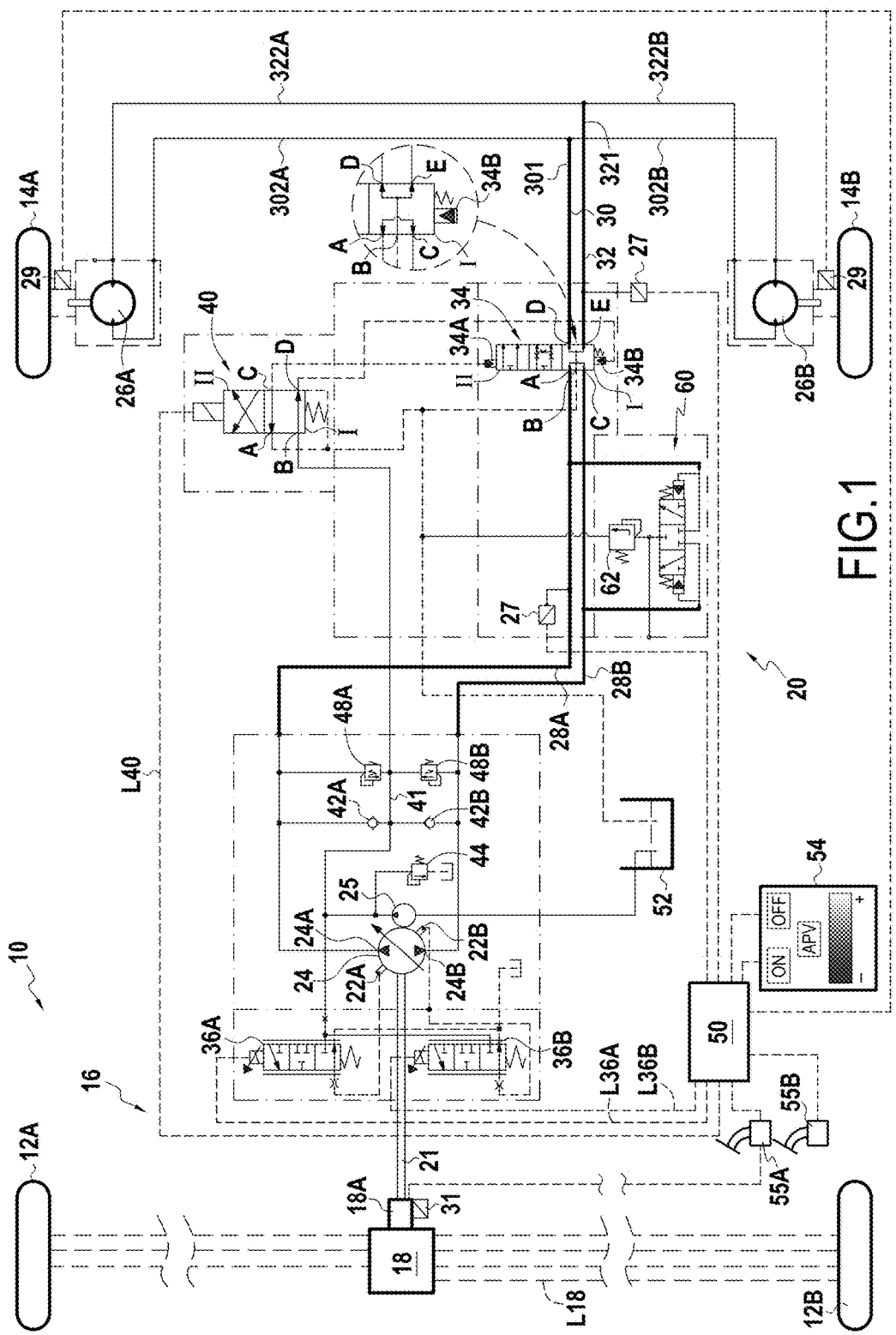
FIG. 1 is a diagrammatic view of transmission apparatus of a vehicle that makes it possible to implement the method of the invention.

FIG. 1 shows transmission apparatus of a vehicle 10 having two rear wheels 12A & 12B, and two front wheels 14A & 14B. In the normal state, the drive for the vehicle is provided by a mechanical transmission 16, which is the main transmission. This mechanical transmission connects a drive engine 18 to the wheels 12A and 12B (e.g. the rear wheels), and thereby, on its own, provides the drive for the vehicle most of the time.

The engine 18 is connected to the mechanical transmission 16 via a clutch 18A. It may be an internal combustion engine (fueled by gasoline, liquefied petroleum gas (LPG), or some other fuel), or indeed it may be an engine or motor of some other type, such as an electric motor, etc.

In addition to the mechanical transmission, the transmission apparatus also includes a hydraulic transmission 20 that is activated by way of assistance for propelling the vehicle under difficult road conditions (sloping road, slippery road, etc.) or, in accordance with the invention, at low speed, in particular for assisting with causing the vehicle to start moving. This hydraulic transmission makes it possible to transform the two wheels 14A and 14B into driven wheels even though they are not driven by the mechanical transmission. Thus, by means of the hydraulic transmission 20, the vehicle has operating modes in which all four wheels 12A, 12B, 14A, and 14B are driven wheels.

Although in this embodiment, the hydraulic assistance is applied to the front wheels 14A and 14B, it could equally well be applied to rear wheels.

The hydraulic transmission 20 is coupled to a shaft 21 that is connected to the power outlet of the engine 18, from which it draws the energy that it transmits to the wheels 14A, 14B when it is activated.

More precisely, the hydraulic transmission includes a pump 24 that is connected to the outlet shaft 21 of the drive engine 18 in such a manner as to be driven by said drive engine. This pump 24, also referred to below as the "main pump", serves to feed the hydraulic motors 26A and 26B that are coupled to respective ones of the wheels 14A and 14B.

The main pump 24 is of the variable cylinder capacity type, in particular it is a reversible pump having a variable delivery rate, of the type having a swashplate cam, of positioning that causes the cylinder capacity of the pump to vary.

In the example shown, the hydraulic transmission also includes an auxiliary pump 25 or "boost" pump that, in a manner known per se, serves to maintain a minimum boost pressure in the components of the circuit in such a manner as to avoid cavitation phenomena. The pump 25 has a fixed cylinder capacity, its delivery pressure being limited by a pressure limiter 44 in such a manner as to maintain the boost pressure $P_G$, e.g. about 30 bars, in a boost duct 41.

Both the main pump 24 and the auxiliary pump 25 are connected to the outlet shaft 21 of the engine 18, and are therefore actuated by it together. Optionally, the main pump and the auxiliary pump may also be driven by two separate shafts, or the auxiliary boosting may be provided by an electrically driven pump unit.

The hydraulic transmission circuit comprises two pump ducts 28A, 28B, connected to the main orifices 24A, 24B of the pump 24. Depending the operating direction of the pump 24, said pump ducts respectively feed fluid to the hydraulic motors and discharge fluid therefrom, or vice versa.

These pump ducts 28A, 28B may be put into communication with respective ones of two motor ducts 30, 32, via an activation valve 34. Each of these motor ducts has a first portion 301, 321 suitable for being connected to a pump duct, and a second portion in which each duct splits into two branches 302A, 302B, and 322A, 322B respectively, which branches are connected to feed and discharge enclosures of the motors 26A and 26B.

The pressure in that one of the pump ducts 28A, 28B that has the lower pressure is limited by an exchange valve 60 associated with a pressure limiter 62 connected to an unpressurized reservoir 52 (i.e. to a reservoir at atmospheric pressure), in such a manner as to maintain, in the pump duct that is at the lower pressure, a pressure equal to the rating pressure of the pressure limiter 62, e.g. about 22 bars.

It should be noted that, in the hydraulic apparatus 20, the exchange valve 60 is optional.

In a manner known per se, the motors 26A, 26B are, in particular, hydraulic motors having radial pistons, similar to the motors described, for example, in French Patent No. 2 504 987.

These motors may be engaged or disengaged (clutched or declutched) in particular by causing the pressure prevailing in their casings to vary, e.g. as indicated in European Patent No. 0 993 982.

However, other types of hydraulic motors could be provide, e.g. motors having axial pistons.

Each of the motors 26A, 26B has an outlet shaft, connected to a respective one of the wheels 14A, 14B. When the hydraulic transmission 20 is in drive mode, under the effect of the pressure difference imposed by the main pump between the pump ducts, and thus between the motor ducts, the motors 26A and 26B deliver drive torque that enables them to drive the wheels 14A, 14B.

Conversely, when the pressure difference imposed by the main pump reverses between the pump ducts, and thus between the motor ducts (the pressure at the delivery orifice of the pump 24A then being less than the pressure at its feed orifice 24B), the hydraulic transmission 20 is in braking mode, and the motors 26A and 26B deliver braking torque that tends to brake the wheels 14A, 14B.

The general function of the activation valve 34 is to activate or to deactivate the hydraulic transmission 20:

in deactivated mode, only the mechanical transmission serves to drive the vehicle; and in the activated mode, the mechanical transmission and the hydraulic transmission can drive the vehicle together. However, in this mode, the hydraulic transmission 20 can, at times, be inactive (or declutched) with the motors not delivering any torque, namely when the apparatus is operated in a torque-free mode presented below. In addition, it is possible to imagine an operating mode in which the hydraulic transmission is activated only during gear changes, when the mechanical transmission is momentarily declutched. However, the invention relates more particularly to the activated mode while the vehicle is traveling at low speed, e.g. at a speed less than 5 km/h.

The valve 34 has three upstream ports A, B, C, two downstream ports D and E, and two positions I and II. An intermediate position taken up in merely transient manner is also shown in FIG. 1.

The activation valve 34 also has two hydraulic control chambers 34A, 34B.

In this text, the terms "upstream" and "downstream" as applied to the ports of a valve designate, in general, the most frequent direction of flow of fluid or of transmission of a command, without this excluding other operating modes.

Ports A and C are connected to respective ones of the pump ducts 28A and 28B. Port B is connected to the reservoir 52.

Ports D and E are connected to respective ones of the first portions 301 and 321 of the motor ducts 30 and 32, and are thus connected to respective ones of the feed and discharge orifices of the motors 26A and 26B.

The control chambers 34A and 34B are connected to respective ones of the ports C and D of a control valve 40 that is described below and that, in this example, is a solenoid valve.

The activation valve 34 is also provided with a return spring that urges the valve 34 to stay in the first position I.

In the first position I, ports B, D, and E are interconnected, and ports A and C are interconnected. In the second position II, ports A and D are interconnected, ports C and E are interconnected, and port B is isolated.

As shown by the intermediate box shown in FIG. 1 for the valve 34, in the intermediate position between the positions I and II, the four ports A, C, D, and E are interconnected via constrictions, while, conversely, port B is isolated.

Thus, when the valve 34 is in the first position I, the pump ducts 28A, 28B are interconnected (bypass position). In addition, the motor ducts 30 and 32 are interconnected, while also being connected to the reservoir 52. The motors 26A and 26B are thus inactive. They can then be declutched, i.e. put into a free-wheel situation, in different manners.

For example, the pistons of the hydraulic motors can be retracted into their cylinders, as described in European Patent No. 0 993 982. It is also possible to imagine disengaging the rotors of the motors relative to their outlet members. For example, the engagement between the rotors and the outlet members takes place by positive clutches or by friction, and the disengagement consists in causing the co-operation of the clutches to cease or in reducing the friction.

When the valve 34 is the second position II, the motor ducts are connected to the pump ducts and they feed the motors 26A, 26B so that they drive the wheels 14A, 14B. This position corresponds to the hydraulic transmission 20 being in the activated position.

This transmission 20 is fed with fluid in the following manner.

When the main pump 24 is driven by the drive engine 18, the fluid flows in the feed direction from the pump in one of the pump ducts 28A and 28B, and in the delivery direction towards the pump in the other one of said pump ducts.

The pump ducts 28A, 28B are connected to the boost duct 41 via check valves 42A, 42B so that the pressure in said ducts remains no less than the boost pressure $P_G$, and via pressure limiters 48A, 48B so as to avoid any excess pressure.

The control solenoid valve 40 makes it possible to place the hydraulic transmission 20 in the activated mode or in the deactivated mode.

This solenoid valve 40 has two upstream ports A and B, two downstream ports C and D, two positions I and II, and a return spring that urges it to stay in its position I.

Port A is connected to the reservoir 52. Port B is connected to the boost duct 41. Ports C and D are connected to the control chambers 34A and 34B of the valve 34.

When the solenoid valve 40 is in position I, its ports A and C are interconnected, and its ports B and D are interconnected, so that the control chamber 34B is fed via the boost duct 41, while the control chamber 34A is connected to the reservoir. As a result, the valve 34 is placed in its position I shown in FIG. 1, in which the motor ducts 30 and 32 are isolated from the pump ducts, so that the hydraulic transmission is not active. When the solenoid valve 40 is in position II, its ports A and D are interconnected and the ports B and C are interconnected, so that this time it is the chamber 34A that is fed and the chamber 34B that is connected to the reservoir, thereby placing the valve 34 in is position II, and thereby connecting the motor ducts to the pump and therefore activating the hydraulic transmission.

As indicated above, the pump 24 has a variable cylinder capacity. In order to cause the cylinder capacity to vary, the hydraulic transmission comprises two control progressive solenoid valves 36A and 36 that can be moved between two end positions, in which they connect one of the control chambers 22A, 22B of the swashplate cam of the pump 24 to the reservoir, and they connect the other of said chambers to the boost duct 41.

The hydraulic transmission 20 is controlled by an electronic control unit 50 that is connected to the various solenoid valves and to the various sensors of said transmission 20 via circuits that are shown in fragmentary manner only.

The control unit is connected to a user interface 54 that enables the driver of the vehicle to activate or deactivate the hydraulic transmission 20. This interface makes various operating modes possible:

hydraulic transmission activated to enable hydraulic assistance to be given to the drive engine when the vehicle is in a "normal" driving situation (ON button);

hydraulic transmission totally deactivated so that the vehicle is driven by the mechanical transmission only (OFF button); and hydraulic transmission partially activated, i.e. being activated only when need for assistance is detected (APV button).

For example, by default, the hydraulic assistance is put into the "activated" mode when the driver switches on the ignition on the dashboard of the vehicle, after a total standstill stage. This means that, when the vehicle actually starts moving, the hydraulic transmission is ready to deliver the assistance with starting. If the driver does not want such assistance, said driver may, however, deactivate the hydraulic transmission via the OFF button. It is also conceivable for this deactivation to be valid only for the starting in progress or, conversely, for it to become the mode adopted by default for the next starts, in which case actuating the ON button can activate the hydraulic assistance for the starting in progress, or make the "activated" mode the default mode again.

It is also possible to make provision for the assistance to go automatically over to "activated" mode when the vehicle is travelling at low speed, while the amplitude of the actuation of the acceleration control is not zero.

The "partially activated" mode may have more than one use, e.g. it can be used to make hydraulic assistance possible at low speed, in particular for assisting with changing gear.

Via a slide, a potentiometer, or the like, as shown under the APV button, the driver may have the possibility of choosing the intensity of the assistance provided by the hydraulic transmission, in particular for the assistance with starting.

The control unit 50 is connected to the solenoid valve 40 via a control line L40, so as to cause said solenoid valve to go into its position I, in which the hydraulic transmission is inactive, or into its position II, in which the hydraulic transmission is active.

Via control lines L36A and L36B, the control unit 50 also controls the solenoid valves 36A and 36B to control the cylinder capacity of the main pump 24.

In addition, the control unit receives information about the driving conditions of the vehicle. In particular, it is suitable for detecting a low-speed situation, in particular a starting situation in which the vehicle is starting to move, and in which it is desirable for hydraulic assistance to be caused to be given by implementing a low-speed assistance stage.

Such a low-speed situation may be detected by the fact that the speed of the vehicle is low, e.g. lower than 5 km/h, while a low gear (in particular first gear) is engaged and while the acceleration control is actuated.

The starting situation may be detected in the same way, and optionally in addition by the fact that the initial speed of the vehicle is zero.

More precisely, assistance with starting may be triggered by the acceleration control of the vehicle being actuated over a determined amplitude (e.g. a percentage of its maximum stroke, such as 5% or 10%), after the vehicle has been at a standstill, optionally combined with the clutch control being actuated. The choice of choosing to trigger the assistance with starting only when the acceleration control is actuated over a determined amplitude makes it possible to avoid undesired assistance with starting.

For example, a position sensor 55A is associated with the accelerator pedal of the vehicle and transmits the information it acquires to the control unit 50. Similarly, a position sensor 55B may be provided on the clutch pedal. The declutching situation may also be detected by a sensor (not shown) connected to the clutch 18A.

The control unit 50 controls activation and deactivation of the hydraulic transmission 20 by causing the solenoid valve 40 to go either into its position II, thereby placing the valve 34 in its position II and causing the hydraulic transmission to be activated, or into its position I, thereby placing the valve 34 in its position I and causing the hydraulic transmission to be inactivated.

When the hydraulic transmission is activated, the motors 26A and 26B go from their free-wheel configuration to an active configuration, thereby enabling said motors to deliver outlet torque (but, as explained below, a torque-free operating mode is also possible). For example, the fluid pressure in the motor ducts urges the pistons outwards from their cylinders or, optionally via an activation duct (not shown), causes the rotors of the motors to be engaged with their outlet members.

When the hydraulic transmission is deactivated, e.g. so as to cause the low-speed assistance stage to cease, the hydraulic motors go over to their free-wheel configurations by a reverse process.

In accordance with the invention, once the assistance-with-starting situation is detected or when a need for hydraulic assistance at low speed makes itself felt, a low-speed assistance stage is performed. For this purpose, a setpoint pressure is established for the pressure difference between the feed and the discharge of each of the hydraulic motors, said motors are fed via the main pump 24, and the delivery rate of said pump is adjusted so that, by being driven by the drive engine, it maintains a pressure difference across the respective terminals of each of the hydraulic motors that is equal to said setpoint pressure. For example, it is by adjusting the cylinder capacity of the main pump that its delivery rate is adjusted.

To this end, the apparatus has pressure sensors suitable for detecting the pressures at the terminals of the hydraulic motors. These sensors may be disposed on respective ones of the motor ducts 30 and 32. In the example shown, two pressure sensors 27 are used, disposed respectively on the pump duct 28A and on the motor duct 32, which amounts to the same thing because, when the valve 34 is in its active position II, the pump duct 28A is connected to the motor duct 30. The sensors 27 are connected to the control unit 50, to which they supply the pressures $P_A$ and $P_B$ prevailing at respective ones of the terminals of the hydraulic motors.

Pressure control is performed, i.e. the cylinder capacity of the main pump is caused to vary so as to obtain a given pressure difference across the terminals of each of the motors that is servo-controlled to the setpoint pressure. In other words, it is sought to obtain a drive torque value given by the setpoint pressure.

The setpoint pressure may be a pressure value that is fixed throughout the low-speed assistance stage, e.g. 150 bars. However, it is advantageous to cause the setpoint pressure to vary during the low-speed assistance stage, in particular from a maximum value CPmax at the beginning of the low-speed assistance stage to a minimum value CPmin at the end of said stage.

Figure 2A:
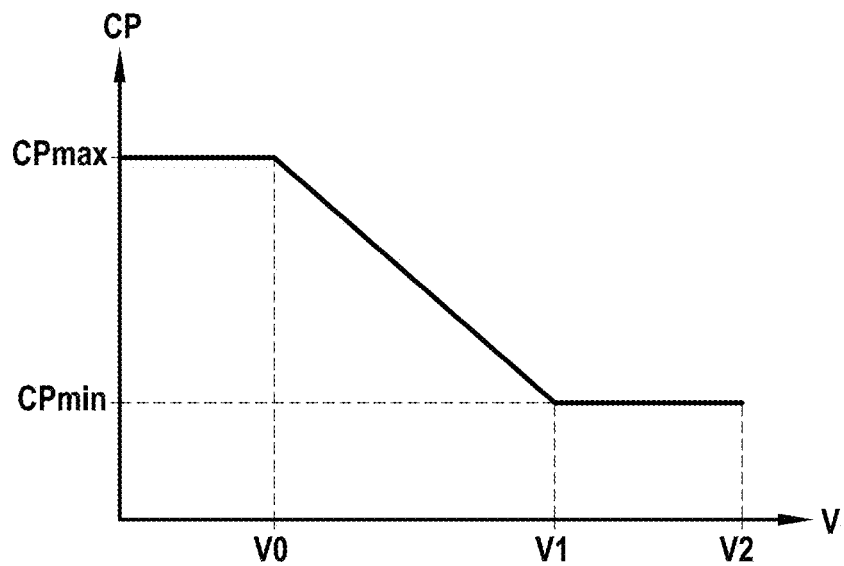
FIGS. 2A and 2B are curves that illustrate examples of variation relationships for varying the setpoint pressure.
Figure 2B:
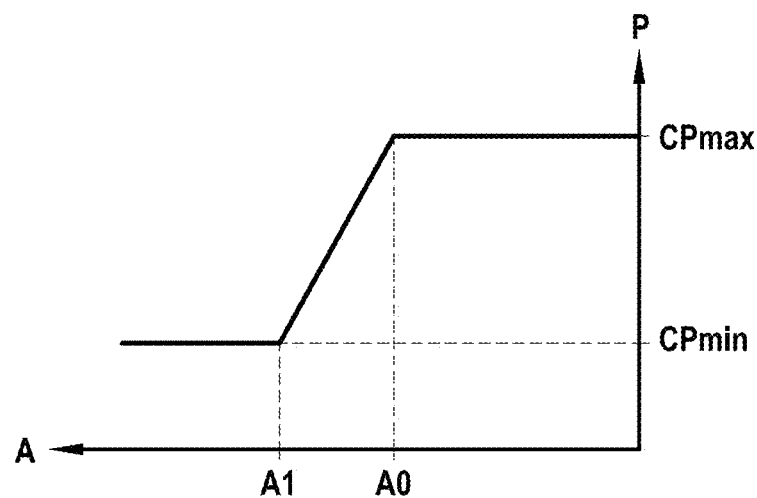

This is what is shown in FIGS. 2A and 2B.

FIG. 2A gives an example of variation in the setpoint pressure, in which example said setpoint pressure CP depends on the speed V of the vehicle. Starting from the beginning of the low-speed assistance stage, the setpoint pressure is fixed at a value CPmax and remains stable at that value until the speed of the vehicle has reached the speed V0, e.g. approximately in the range 2 km/h to 5 km/h. Then, with the speed continuing to increase, the setpoint pressure decreases to the value CPmin, reached at the speed V1, e.g. equal to 10 km/h. The low-speed assistance stage may cease once said speed V1 is reached, or it can remain activated, while the setpoint pressure remains at said value CPmin, until a higher speed V2 (e.g. 15 km/h) is reached, or else for a predetermined duration (e.g. 20 s), or indeed until an entire total duration (e.g. 1 minute) has elapsed since the beginning of the low-speed assistance stage. In FIG. 2A, the relationship for the decrease in the setpoint pressure CP between the speeds V0 to V1 is linear. Naturally, a non-linear decrease is also possible.

FIG. 2B shows another example of variation in the setpoint pressure, in which example the setpoint pressure CP depends on the amplitude A of actuation of the acceleration control of the vehicle, in particular the amplitude of actuation of a acceleration pedal. In this example, the setpoint pressure CP remains equal to the maximum value CPmax so long as the amplitude A remains greater than a predetermined amplitude A0. This amplitude A0 is, for example, a percentage of the total stroke of the acceleration control, e.g. about 20%. The amplitude A becoming less than said amplitude A0 expresses a smaller need for acceleration, which, in principle, means that the vehicle has reached a speed that the driver deems to be close to the desired speed for the gear engaged. The low-speed assistance may cease once the amplitude A becomes less than said amplitude A0, or else continue, e.g. so long as the amplitude remains greater than a determined amplitude A1, e.g. 10% of the maximum stroke. If said assistance continues, it is then advantageous for the setpoint pressure CP to decrease between the amplitudes A0 and A1, e.g. linearly. Once the amplitude A1 has been reached, it is possible to cause the low-speed assistance stage to cease, or else to have it continue for a determined duration (e.g. from 5 s to 10 s) from the moment at which the amplitude A1 was reached.

In the above-mentioned examples, obtaining the speed V0 or detecting the amplitude A0 means that an intermediate state has been reached and that it is therefore possible to start decreasing the setpoint pressure.

Other variation relationships for varying the setpoint pressure are possible. For example, it is possible not to maintain the setpoint pressure at the value CPmax initially, but rather to cause it to decrease continuously, or else to accentuate the gradient of its decrease progressively. It is also possible to choose to cause the setpoint pressure to depend on time, e.g. on the basis of a curve analogous to the curve of FIG. 2A, by replacing the speeds V0, V1, and V2 by durations.

In the examples described above, the setpoint pressure is set at a value CPmax at the beginning of the low-speed assistance stage. This value CPmax is, in particular, determined by the formula f×Pmax, where Pmax is the ceiling for the setpoint pressure. This ceiling is the maximum value for the pressure difference across the terminals of each of the hydraulic motors that is acceptable by the apparatus, in particular as a function of the specificities of the hydraulic components. For example, it is about 250 bars. The coefficient f is less than or equal to 1, and depends on the characteristics of the low-speed assistance that is required.

It is indicated above that, via a slide, a potentiometer or the like, the driver can choose the intensity of the low-speed assistance. For example, this slide may serve to determine the value of the coefficient f.

It is also possible for the characteristic of the low-speed assistance to be chosen as being the amplitude of actuation of the acceleration control at the time when the low-speed assistance stage starts. For example, f may be equal to 1 when said amplitude is greater than a determined percentage of the maximum stroke of the acceleration control, which percentage is, in particular, in the range 20% to 40%, and more particularly 30%.

The value CPmin may be about 80 bars. It is a pressure that is sufficiently low not to deliver significant hydraulic torque, while also allowing pressure to build up rapidly in the hydraulic ducts if the need makes itself felt, e.g. in the event of wheelspin of the wheels driven by the mechanical transmission.

As indicated above, it is possible to cause the low-speed assistance stage to cease once a speed deemed sufficient has been reached. Other events may trigger the end of the low-speed assistance stage, in particular the fact that the duration of said stage reaches a predetermined duration, or that the outlet torque needed from the mechanical transmission decreases to a predetermined value, or indeed the fact that the clutch has been released for a predetermined duration after having been actuated, in particular for starting. The duration for which the clutch has been released may be equal to 0, i.e. it is possible to cause the low-speed assistance, in particular when it is assistance with starting, to cease at the time at which the clutch is released.

To cause the low-speed assistance stage to cease, it is possible to inactivate the hydraulic motors, e.g. by disengaging their pistons from their cams or by placing the swashplate cam of the pump 24 in a neutral position. It is also possible to cause the low-speed assistance stage to cease by putting the hydraulic transmission into its "partially activated" state in which the motors deliver zero torque.

As indicated above, the hydraulic transmission can be totally deactivated, activated, or partially activated.

In general, the hydraulic transmission serving to assist the mechanical transmission is active below an application limit threshold. Below said threshold, the hydraulic transmission can go automatically to the "deactivated" state or to the "partially activated" state, and, as a function of that, the user interface 54 can change the states of the above-mentioned ON, OFF, and APV buttons.

As indicated in non-prepublished French Patent Application No. FR 13/53043, the situation in which the hydraulic transmission is partially activated may correspond to said hydraulic transmission being put into a "torque-free" mode.

To make the motors 26A and 26B inactive in the "torque-free" mode, the valve 34 is maintained in the position II, and, by means of the control unit 50, the cylinder capacity of the pump 24 is regulated by acting on the above-mentioned solenoid valves 36A and 36B so that the pressures at the feed orifice 24A and at the discharge orifice 24B of the pump 24 are substantially equal.

To make such regulation possible, use is made of the two above-mentioned pressure sensors 27 that measure the pressures $P_A$ and $P_B$ at the terminals of each of the motors. On the basis of these pressure values, the control unit 50 causes the value of the cylinder capacity of the pump 24 to vary and regulates it in such a manner that the pressures $P_A$ and $P_B$ become equal. This regulation can be performed by any appropriate control algorithm, e.g. by using proportional-integralderivative (PID) control or the like.

Thus, in this mode of regulation, the system uses the pressure information given by the pressure sensors 27 to determine the cylinder capacity of the pump.

In addition, the lower of these pressures (normally $P_B$ when the vehicle is moving forwards) is constrained to be equal to the exchange pressure $P_E$ by the exchange valve 60.

In the preceding example, the invention is illustrated by an embodiment with two motors 26A and 26B placed in parallel. Naturally, the invention may be implemented with any number of motors, and regardless of their configuration (in series, in parallel, or a combination of those two configurations), provided that the control unit determines the outlet speed of the drive motor 18 and controls the cylinder capacity of the main pump 24 as described above.

As explained above, the apparatus of FIG. 1, which uses pressure sensors 27, makes it possible to perform control by pressure.

In the example shown, this apparatus also includes speed sensors 29 measuring the outlet speeds of the hydraulic motors or the speeds of the wheels they drive.

Depending on the control mode that is to be implemented, it is possible for the sensors 27 and 29 to be caused to coexist, or else to use a single one of these categories of sensor. For example, as indicated in French Patent Application No. FR 13/53043, it is possible, while the hydraulic transmission is in partial activation mode, to make provision for said transmission not to generate any torque. This is useful outside clutching or low-speed assistance situations, or in any situation in which assistance is not required.

In such a situation, the control unit 50 can determine the cylinder capacity of the pump so that the outlet torque from the hydraulic motors is substantially zero, on the basis of information on the speeds of rotation of the wheels or of the hydraulic motors that is supplied by the sensors 29, and on the basis of information on speed of rotation of the rotor of the pump 24 that is supplied by the sensor 31. For this purpose, the cylinder capacity of the pump is computed such that the speeds of rotation of the outlet shafts of the hydraulic motors 26A, 26B, as computed on the basis of the speed of rotation of the rotor of the pump 24 and on the basis of the respective cylinder capacities of the pump and of the motors, are equal to the actual speeds of rotation of the outlet shafts of the motors 26A, 26B (i.e. the speeds of rotation of the wheels 14A, 14B) as measured by the sensors 29.

The speed of rotation of the shaft of the pump 24 together with the cylinder capacity of said pump determines the rate of fluid delivered by the pump 24 towards the motors 26A, 26B. The speeds of rotation of the outlet shafts of the motors are deduced from this delivery rate, given the cylinder capacities of said motors.

By choosing a pump cylinder capacity that makes the speeds of rotation of the outlet shafts of the motors 26A, 26B equal to the speeds of rotation of the wheels 14A, 14B, the control unit 50 controls the pump 24 in such a manner that the fluid pressures at the feed and discharge orifices of the motors 26A, 26B remain substantially equal, and that the motors 26A and 26B do not deliver any torque to their outlet shafts.

Naturally, the links between the control unit 50 and the various members that it controls by transmitting information to them or from which it receives information, may be implemented by any means suitable for transporting information, be such links wired, or otherwise.

The invention claimed is:

1. A method of controlling transmission apparatus of a vehicle, the apparatus comprising a drive engine, a mechanical transmission connected to the drive engine for driving the vehicle, and a hydraulic transmission having a pump and n hydraulic motors, n is greater than or equal to 1, the pump being suitable for being driven by the drive engine for feeding fluid to the hydraulic motors, said method comprising performing a low-speed assistance stage, during which, while the vehicle is driven by the mechanical transmission, a setpoint pressure for the pressure difference between the feed and the discharge of each of the hydraulic motors is established, the hydraulic motors are fed by the pump, the pressure difference between the feed and the discharge of each of the hydraulic motors is detected, and the delivery rate of the pump is adjusted so that said pressure difference is substantially equal to said setpoint pressure so that the vehicle is driven both by the mechanical transmission and by the hydraulic transmission during the low-speed assistance phase.

2. A method according to claim 1, wherein a starting situation in which the vehicle starts being driven by the mechanical transmission is detected, and the low-speed assistance stage is performed as assistance with the starting.

3. A method according to claim 2, wherein, when the starting situation is detected, the assistance with starting remains inactivated so long as the amplitude of actuation of the acceleration control of the vehicle has not reached a target amplitude.

4. A method according to claim 1, wherein the low-speed assistance stage is caused to cease when at least one of the following events occurs:
 a parameter representative of the speed of the vehicle reaches a predetermined value;
 the duration of the low-speed assistance stage reaches a predetermined duration;
 the outlet torque needed from the mechanical transmission decreases to a predetermined value; and
 a clutch connecting the mechanical transmission to the drive engine is released for a predetermined duration, which may be equal to 0, after it has been actuated.

5. A method according to claim 1, wherein the value of the setpoint pressure is caused to vary during the lowspeed assistance stage.

6. A method according to claim 5, wherein, during the low-speed assistance stage, the value of the setpoint pressure is caused to decrease from a maximum value CPmax to a minimum value CPmin, said minimum value CPmin being reached at the end of the low-speed assistance stage.

7. A method according to claim 6, wherein a setpoint pressure ceiling Pmax is defined and the maximum value for the setpoint pressure CPmax is determined, using the relationship CPmax=f×Pmax, the coefficient f being less than or equal to 1, and being a function of requested characteristics for the low-speed assistance, such as the amplitude of actuation of the acceleration control of the vehicle.

8. A method according to claim 7, wherein the coefficient f is equal to 1 when the amplitude of actuation of the acceleration control is at least equal to a predetermined percentage of the total stroke of said control, said predetermined percentage being, in particular, in the range 20% to 40%, and more particularly 30%.

9. A method according to claim 6, wherein the value of the setpoint pressure is maintained at the maximum value CPmax from the beginning of the low-speed assistance stage to the moment at which the drive of the vehicle reaches a determined intermediate state, and then the value of the setpoint pressure is caused to decrease to the minimum value CPmin reached at the end of the lows-peed assistance stage.

10. A method according to claim 9, wherein the value of the setpoint pressure is caused to decrease using a determined variation relationship, in particular a linear variation relationship.

11. A method according to claim 9, wherein the intermediate state is reached when a parameter representative of the speed of the vehicle reaches a determined intermediate value.

12. A method according to claim 1, wherein activation of the low-speed assistance is enabled or is disabled.

13. A method according to claim 1, wherein, during the low-speed assistance stage, the delivery rate of the pump is adjusted by causing the cylinder capacity of said pump to vary.

14. A method according to claim 1, wherein switching-over is performed between a low-speed assistance stage and a hydraulic assistance stage in which the delivery rate of the pump is determined as a function of the outlet speed of the mechanical transmission.

15. A vehicle including transmission apparatus controlled by a method according to claim 1.

* * * * *